United States Patent [19]

Taylor

[11] 4,305,290

[45] Dec. 15, 1981

[54] URINE METER

[75] Inventor: Glenn N. Taylor, Cary, Ill.

[73] Assignee: The Kendall Company, Boston, Mass.

[21] Appl. No.: 101,034

[22] Filed: Dec. 6, 1979

[51] Int. Cl.³ .................... G01F 19/00; A61B 19/00
[52] U.S. Cl. .................................... 73/427; 128/762
[58] Field of Search ............... 73/427; 128/760, 762, 128/764, 767; 422/58, 102

[56] References Cited

U.S. PATENT DOCUMENTS

| | | | |
|---|---|---|---|
| 3,499,327 | 3/1970 | Lane | 128/762 |
| 3,661,143 | 5/1972 | Henkin | 128/762 |
| 3,683,894 | 8/1972 | Villari | 128/767 |
| 3,831,453 | 8/1974 | McWhorter | 73/427 |
| 4,095,589 | 6/1978 | Manschot et al. | 128/762 |
| 4,265,118 | 5/1981 | Griesel | 73/427 |

Primary Examiner—James J. Gill
Attorney, Agent, or Firm—Powell L. Sprunger

[57] ABSTRACT

A urine meter comprising, a receptacle having a chamber, an inlet port for passage of urine into the chamber, and a plurality of generally upright spaced dividers in the chamber defining a plurality of generally upright compartments separated by the dividers intermediate adjacent compartments, with adjacent compartments communicating with each other over an upper portion of the dividers. The urine meter directs urine from the inlet port to one of the compartments such that urine serially overflows from the one compartment into the other compartments. The urine meter has a collection bag having a cavity, and the urine meter communicates between the chamber and an upper portion of the cavity.

18 Claims, 6 Drawing Figures

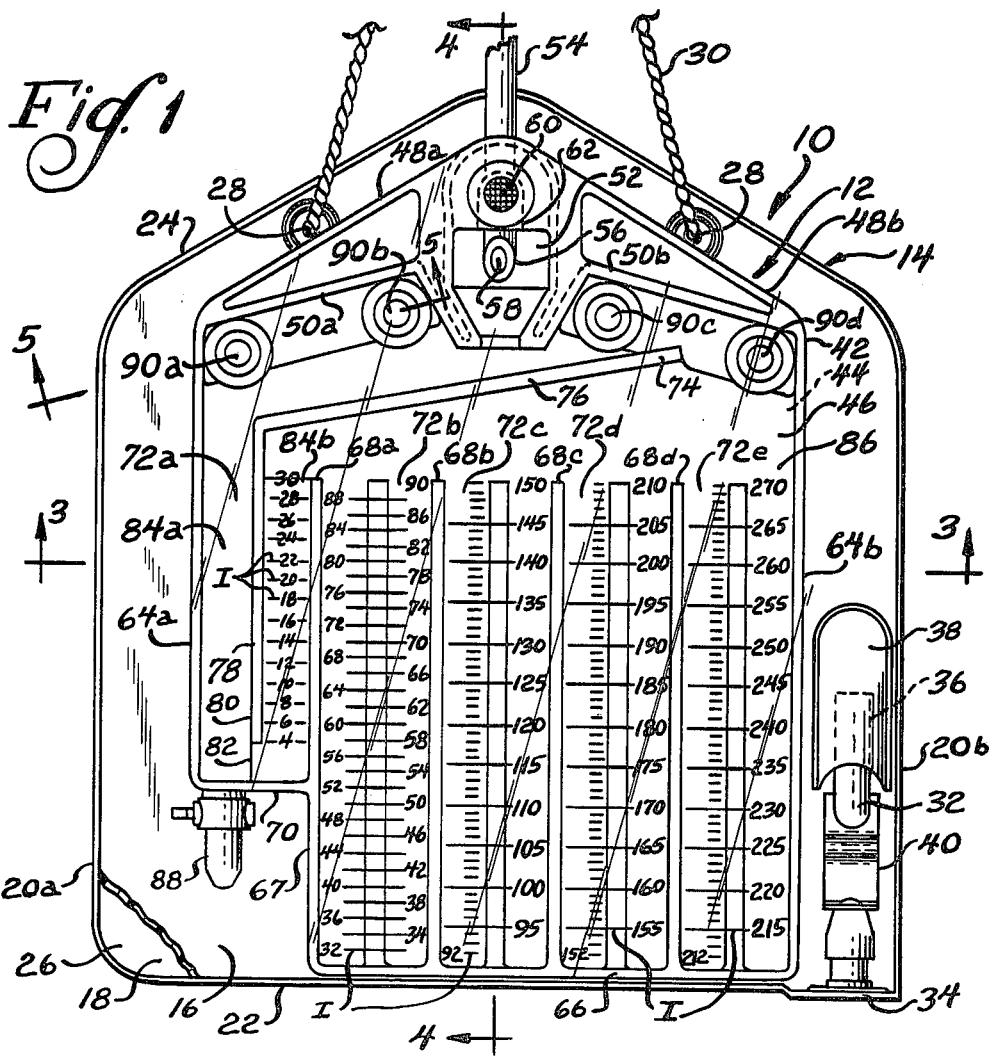

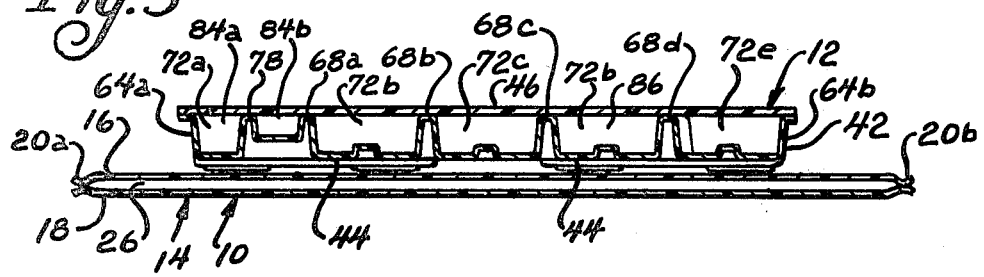
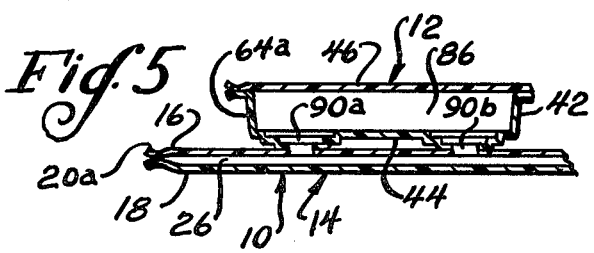
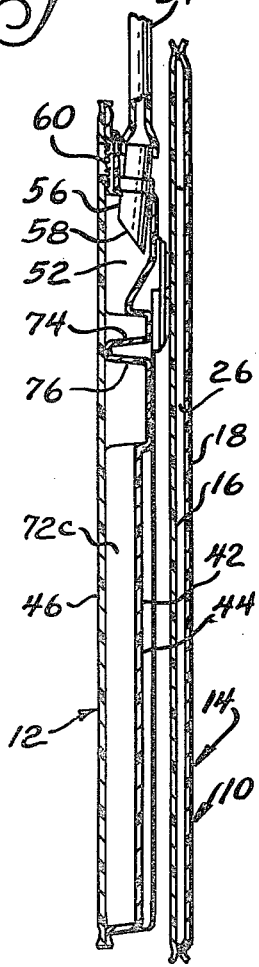
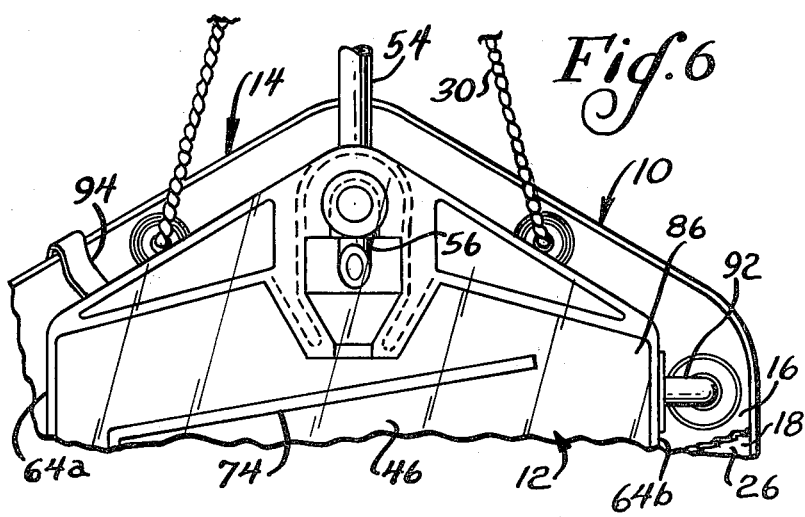

URINE METER

BACKGROUND OF THE INVENTION

The present invention relates to liquid drainage systems, and more particularly to urine meters.

Before the present invention, urine meters have been proposed for use with catheterized patients. Typically, the urine meters comprise a receptacle and a collection bag, with the receptacle communicating with the collection bag, such that the urine output may be measured for a period of time in the receptacle after which the urine overflows or is emptied into the collection bag for retention therein. The receptacle may be tapered in order to provide a relatively accurate determination of small volumes of urine prior to passage into the collection bag. However, the present urine meters do not have the capability of accurately measuring large volumes of urine prior to passage into the collection bag where precise volume determinations of urine is difficult. Also, it is difficult to obtain a fresh sample of urine from the current urine meters, since relatively stale urine may remain at the bottom of the receptacle where the sample is taken.

SUMMARY OF THE INVENTION

A principal feature of the present invention is the provision of an improved urine meter.

The urine meter comprises, a receptacle having a chamber, an inlet port for passage of urine into the chamber, and a plurality of generally upright spaced dividers in the chamber defining a plurality of generally upright compartments separated by the dividers intermediate adjacent compartments. The receptacle has means for directing the urine from the inlet port to one of the compartments. The urine meter has a collection bag having a cavity, and means communicating between the chamber and an upper portion of the cavity.

A feature of the present invention is that adjacent compartments communicate with each other over an upper portion of the dividers, such that urine serially overflows from the one compartment into the other compartments.

Another feature of the invention is that a relatively accurate determination of the urine volume in the receptacle may be made by comparing the height of liquid in the compartments with indicia on the receptacle.

Still another feature of the invention is that the urine volume may be accurately determined in the receptacle for relatively large urine volumes over an extended period of time.

Yet another feature of the invention is the provision of valve means communicating with a lower portion of the one compartment to obtain a fresh sample of urine when desired.

A further feature of the invention is that the urine from the receptacle may be emptied into the collection bag to initiate collection of a new urine sample in the receptacle.

Further features will become more fully apparent in the following description of the embodiments of this invention and from the appended claims.

DESCRIPTION OF THE DRAWINGS

In the drawings:

FIG. 1 is a fragmentary front plan view of a urine meter of the present invention;

FIG. 2 is an exploded view illustrating components of the urine meter of FIG. 1;

FIG. 3 is a sectional view taken substantially as indicated along the line 3—3 of FIG. 1;

FIG. 4 is a fragmentary sectional view taken substantially as indicated along the line 4—4 of FIG. 1;

FIG. 5 is a fragmentary sectional view taken substantially as indicated along the line 5—5 of FIG. 1; and FIG. 6 is a fragmentary front plan view of another embodiment of a urine meter of the present invention.

DESCRIPTION OF THE PREFERRED EMBODIMENTS

Referring now to FIGS. 1-5, there is shown a urine meter generally designated 10 having a receptacle 12 and a collection bag 14. The collection bag 14 has a front wall 16, and a back wall 18, with the front and rear walls 16 and 18 being made from a flexible plastic material, such as polyvinyl chloride. The front wall 16 and rear wall 18 may be sealed or adhered about their peripheral edges defining a pair of spaced side edges 20a and 20b, a lower edge 22 connecting the side edges 20a and b, and an upper edge 24 connecting the side edges 20a and b. The front and back walls 16 and 18 thus define a cavity 26 intermediate the walls.

The collection bag 14 may have a pair of spaced openings 28 to receive a string 30 which is utilized to secure the urine meter 10 to a bed or other suitable object during catheterization. The collection bag 14 also has a drainage tube 32 communicating with a lower portion 34 of the bag 14 for purposes of draining the urine from the collection bag when desired. An upper portion 36 of the drainage tube 32 is received in a pocket 38 on the front face of the front wall 16, and the drainage tube 32 is releasably closed by a suitable clamp 40 of known type. When it is desired to empty the collection bag, the drainage tube 32 is removed from the pocket 38, and the clamp 40 is opened to permit passage of urine through the drainage tube 32. During collection of urine in the bag 14, the clamp 40 is closed about the drainage tube 32, and the upper portion 36 of the drainage tube 32 is inserted into the pocket 38 for purposes of storage and sterilization.

The receptacle 12 has a housing comprising a rear member 42 having a back panel 44 with raised portions which will be described below, and a transparent front panel 46 which is secured to the front of the rear member 42, with the rear member 42 and front panel 46 being made from a suitable plastic. The rear member 42 has a pair of raised portions defining a pair of top walls 48a and 48b, and a pair of raised portions defining a pair of upper walls 50a and 50b, with the top walls 48a and b and upper walls 50a and b extending from an upper central raised portion defining a drip chamber 52. The urine meter 10 has a drainage tube 54 communicating with a drip tube 56 having a lower portion extending into the drip chamber 52 and defining an inlet port 58 at the lower end of the drip tube 56. The receptacle 12 has a bacterial filter 60 of suitable material communicating through an opening in the front panel 46 and a channel 62 with the drip chamber 52.

The receptacle 12 has raised portions defining a pair of sidewalls 64a and 64b and a raised portion defining a lower wall 66 extending from the sidewall 64b. The receptacle 12 also has a plurality of raised portions defining a plurality of upright spaced dividers 68a, 68b, 68c, and 68d extending upwardly from the lower wall 66, with the dividers 68a, b, c, and d having approximately the same height. As shown, the receptacle 12 also has a raised lower wall portion 70 spaced above the lower wall 66 and extending between the divider 68a and the sidewall 64a. Also, the receptacle 12 has a sidewall portion 71 defined by divider 68a and extending between the lower wall 66 and lower wall portion 70. The divider 68a, lower wall portion 70, and sidewall 64a define a compartment 72a, the dividers 68a and 68b and lower wall 66 define a compartment 72b, the dividers 68b and 68c and lower wall 66 define a compartment 72c, the dividers 68c and 68d and lower wall 66 define a compartment 72d, and the divider 68d, lower wall 66, and sidewall 64b define a compartment 72e, with the compartments 72a, b, c, d, and e having approximately an equal width, and the compartments 72b, c, d, and e having approximately an equal height. Thus, the volume of compartments 72b, c, d, and e is approximately the same, while the volume of compartment 72a is substantially less than the remaining compartments due to its decreased height, as shown.

The receptacle 12 also has a raised portion defining a baffle 74 having a tilted upper portion 76 located below the drip chamber 52 and inlet port 58, and a lower portion 78 which extends from the upper portion 76 into the compartment 72a, with the lower end 80 of the baffle lower portion 78 being spaced above the lower wall portion 70 and defining an opening 82. As shown, the lower baffle portion 78 is laterally located centrally between the divider 68a and the sidewall 64a to define first and second compartments 84a and 84b which communicate with each other adjacent the lower wall portion 70 through the opening 82, with the depth of the second compartment 84b being less than the depth of the first compartment 84a which has a depth approximately equal to the depth of compartments 72b, c, d, and e. As shown, the upper baffle portion 76 is spaced above and covers a plurality of the compartments, such that the baffle directs urine from the inlet port 58 to the first compartment 84a of the one compartment 72a.

The front panel 46 may be secured to the front of the rear member 42 by placement of a suitable adhesive on the previously described raised portions of the receptacle, such that the front panel 46 defines a front wall for the receptacle 12. In this configuration, the back panel 44, upper walls 50a and b, sidewalls 54a and b, lower wall 66, lower wall portion 70, sidewall portion 71, and front panel 46 define a chamber 86 intermediate the rear member 42 and front panel 46, with the dividers separating the chamber into compartments, as previously described.

The receptacle 12 has a suitable valve member 88 communicating with a lower portion of the compartment 72a through the lower wall portion 70. The valve member 88 may be of the type disclosed in U.S. Pat. No. 4,109,837, incorporated herein by reference. Also, the receptacle 12 and collection bag 14 have a plurality of aligned apertures 90a, 90b, 90c, and 90d communicating between an upper portion of the chamber 86 and an upper portion of the cavity 26 for a purpose which will be described below.

In use, the drainage tube 54 is connected to a catheter in a patient, such that urine drains through the catheter, drainage tube 54, drip tube 56, and the inlet port 58 into the drip chamber 52. The urine passing from the inlet port 58 is directed by the baffle 74 to the first compartment 84a of the one compartment 72a, and the urine passes through the opening 82 into the second compartment 84b, such that the height of liquid attained in the first and second compartments 84a and 84b is approximately equal. When the urine collected in the compartment 72a has a sufficient height to reach the upper end of the divider 68a, the urine overflows from the second compartment 84b of the compartment 72a into the compartment 72b where it begins to collect in the lower portion of the compartment 72b. During subsequent catheterization, if the height of liquid collected in the compartment 72b attains a height of the upper end of the divider 68b, the urine then overflows into the next compartment 72c where it collects in a lower portion thereof. If the height of urine in the compartment 72c is sufficient to attain the height of divider 68c, the urine overflows from the compartment 72c into the lower portion of the compartment 68d. Again, if the urine in the compartment 68d attains a height of the divider 68d, the urine overflows from the compartment 68d into the compartment 68e. Thus, the urine serially overflows from the one compartment 72a into the remaining compartments.

As shown, the front panel 46 has volume indicia I associated with the compartments 72a, b, c, d, and e, such that the total volume collected in the receptacle may be readily determined by the height of urine collected in the most right compartment, as illustrated in the drawings. This follows since the indicia indicates the total collective volume of urine in the multiple compartments, rather than in each compartment itself, such that it is unnecessary to add the urine volume in each of the compartments to obtain the total volume.

In the event that it is desired to obtain a sample of urine, the valve member 88 may be opened to extract some urine from the lower portion of compartment 72a. Since the baffle 74 directs the freshest urine into the compartment 72a, and since the stale urine overflows from compartment 72a into the remaining compartments, the sample obtained through the valve member 88 in compartment 72a is relatively fresh compared to the urine collected in the remaining compartments. When it is desired to reinitiate collection of urine in the receptacle 12 or otherwise drain urine from the receptacle 12, the receptacle 12 may be tilted until urine passes through the openings 90a, b, c, and d into the cavity 26 of the collection bag 14 for retention therein.

Thus, in accordance with the present invention, a relatively large volume of urine may be collected in the receptacle, while the indicia associated with the various compartments provides an accurate determination of total volume over an extended period of time. Also, a fresh sample of urine may be obtained through the valve member associated with one compartment containing the freshest urine. The receptacle may be readily emptied into the collection bag for retention of urine in the collection bag, as desired.

Another embodiment of the present invention is illustrated in FIG. 6, in which like reference numerals designate like parts. In this embodiment, the urine meter has a tubular section 92 communicating between an upper portion of the chamber 86 and an upper portion of the cavity 26. The receptacle 12 also has a clip 94 extending from an upper portion of the receptacle 12 and being releasably engagable with an upper portion of the collection bag 14. When it is desired to empty the receptacle of urine, the clip 94 is disengaged from the collection bag 14, and the receptacle 12 is twisted about the tubular section 92 until urine drains from the chamber 86 through the tubular section 92 into the collection bag cavity 26. Of course, it is unnecessary to have the openings 90a, b, c, and d communicating between the receptacle 12 and collection bag 14 in this embodiment. In other respects, the urine meter 10 of FIG. 6 may be identical to the urine meter previously described in connection with FIGS. 1-5.

The foregoing detailed description is given for clearness of understanding only, and no unnecessary limitations should be understood therefrom, as modifications will be obvious to those skilled in the art.

I claim:
1. A urine meter, comprising:
a rigid receptacle having a chamber, an inlet port for passage of urine into the chamber, a plurality of generally upright spaced dividers in the chamber defining a plurality of generally upright compartments separated by said dividers intermediate adjacent compartments, with adjacent compartments communicating with each other over an upper portion of said dividers, and means for directing the urine from the inlet port to one of said compartments such that urine serially overflows from said one compartment into the other compartments;
a collection bag having a cavity and a pair of flexible sidewalls; and
means communicating between said chamber and an upper portion of said cavity to empty the contents of the chamber into the cavity, said compartments being contiguous and in which said one compartment is located at one side of the plural compartments, the directing means comprising a baffle located below said inlet port, the baffle extending into a lateral central portion of the one compartment and is spaced from a lower wall of said one compartment to define an opening, said baffle separating said one compartment into a first compartment communiting with the inlet port and a second compartment communicating with the first compartment through said opening and communicating with an adjacent compartment over one of said dividers.

2. The meter of claim 1 wherein said dividers have approximately the same height.

3. The meter of claim 1 wherein said one compartment has a volume substantially less than the remainder of said compartments.

4. The meter of claim 1 wherein the combined volume of the first and second compartments is substantially less than the volume of the remainder of the compartments.

5. The meter of claim 4 wherein the height of the one compartment is substantially less than the height of the remaining compartments.

6. The meter of claim 5 wherein the width of the first and second compartments is substantially less than the width of the remaining compartments.

7. The meter of claim 1 wherein the depth of the second compartment is less than the depth of the remaining compartments.

8. The meter of claim 1 including valve means communicating with a lower portion of said one compartment to obtain a fresh sample from said one compartment.

9. The meter of claim 1 including drain means communicating with a lower portion of said bag.

10. The meter of claim 1 wherein the communicating means comprises at least one aperture communicating between an upper portion of the receptacle chamber and the upper portion of the bag cavity.

11. The meter of claim 1 wherein the communicating means comprises a conduit connected between an upper portion of the receptacle chamber and an upper portion of the bag cavity.

12. The meter of claim 1 wherein the receptacle comprises a one-piece housing having a rear wall and peripheral walls raised from the rear wall to define the chamber, said housing having members raised from the rear wall in the chamber to define said baffle and said dividers, and a sheet of transparent material extending between said peripheral walls and closing the front of said chamber.

13. A urine meter, comprising:
a rigid receptacle having an inlet port, a front wall, a lower wall, a rear wall, a pair of spaced sidewalls extending from said lower wall, with said lower wall, sidewalls, front wall and rear wall defining a chamber, a plurality of upright spaced dividers extending from said lower wall and defining a plurality of contiguous compartments, with said dividers having approximately an equal height, a baffle extending from a location intermediate the inlet port and a plurality of the compartments into one of said compartments at one side of the contiguous compartments, said baffle being spaced from and covering a plurality of the compartments, a lower portion of said baffle being located intermediate a sidewall and one divider defining said one compartment, and said baffle being spaced from a lower wall portion of said one compartment and defining first and second compartments in the one compartment communicating through an opening intermediate the baffle lower portion and lower wall portion of said one compartment, said lower wall portion of said one compartment being spaced above the lower wall of the remaining compartments, with said one compartment having a volume substantially less than the volume of the remaining compartments;
valve means communicating with a lower portion of said one compartment;
a collection bag having a cavity and a pair of flexible sidewalls; and
means communicating between the chamber and an upper portion of the cavity.

14. The meter of claim 13 wherein said receptacle includes a sidewall portion defined by the one divider extending between the lower wall portion of the one compartment and the lower wall of the remaining compartments.

15. The meter of claim 13 wherein the width of said one compartment is approximately equal to the width of the remaining compartments.

16. The meter of claim 13 wherein the width of the first compartment is approximately equal to the width of the second compartment.

17. The meter of claim 13 wherein the bag is located adjacent the rear wall of the receptacle, and in which the communicating means communicates between an upper portion of the chamber and the upper portion of the cavity.

18. The meter of claim 13 including volume indicia associated with said one compartment and the remaining compartments.

* * * * *